United States Patent
Martin et al.

(10) Patent No.: US 9,815,223 B2
(45) Date of Patent: *Nov. 14, 2017

(54) METHOD AND DEVICE FOR EXTRUSION OF HOLLOW PELLETS

(71) Applicant: GALA INDUSTRIES, INC., Eagle Rock, VA (US)

(72) Inventors: J. Wayne Martin, Buchanan, VA (US); Michael A. Fridley, Troutville, VA (US); Michael Eloo, Xanten (DE)

(73) Assignee: GALA INDUSTRIES, INC., Eagle Rock, VA (US)

( * ) Notice: Subject to any disclaimer, the term of this patent is extended or adjusted under 35 U.S.C. 154(b) by 15 days.

This patent is subject to a terminal disclaimer.

(21) Appl. No.: 14/486,185

(22) Filed: Sep. 15, 2014

(65) Prior Publication Data

US 2015/0001758 A1   Jan. 1, 2015

Related U.S. Application Data

(63) Continuation-in-part of application No. 12/993,062, filed as application No. PCT/US2009/044220 on May 15, 2009, now Pat. No. 8,834,760.

(60) Provisional application No. 61/053,984, filed on May 16, 2008.

(51) Int. Cl.
*B29B 9/06* (2006.01)
*B29C 47/00* (2006.01)
(Continued)

(52) U.S. Cl.
CPC ............... *B29B 9/06* (2013.01); *B29B 9/065* (2013.01); *B29B 9/12* (2013.01); *B29C 47/0011* (2013.01);
(Continued)

(58) Field of Classification Search
CPC .. B29B 9/00; B29B 9/06; B29B 9/065; B29B 9/10; B29B 9/12; B29B 2009/125;
(Continued)

(56) References Cited

U.S. PATENT DOCUMENTS 2,723,028 A    11/1955   Carter
2,932,390 A *   4/1960   Edgecombe ............ B21C 25/04
                                                   72/264
(Continued)

FOREIGN PATENT DOCUMENTS

CN    201002316 Y    1/2008
DE       3243332      1/1984
(Continued)

OTHER PUBLICATIONS

Decision of Rejection in related Chinese Patent Application No. CN2009801163944, dated Feb. 27, 2015.
(Continued)

*Primary Examiner* — Jeffrey Wollschlager
(74) *Attorney, Agent, or Firm* — Troutman Sanders LLP; Ryan A. Schneider; John A. Morrissett

(57) ABSTRACT

Described herein are extrusion processes to produce hollow pellets. Also disclosed are pelletizer devices that can be used to produce the hollow pellets. The processes and devices make use of an extrusion die having a die orifice and an insert that is placed in the die orifice to produce the hollow pellets.

20 Claims, 12 Drawing Sheets

(51) Int. Cl.
  *B29B 9/00*    (2006.01)
  *B29C 47/12*   (2006.01)
  *B29B 9/12*    (2006.01)
  *B29C 47/30*   (2006.01)
  *B29C 47/88*   (2006.01)
  *B29K 101/12*  (2006.01)
  *B29B 9/16*    (2006.01)

(52) U.S. Cl.
  CPC ...... *B29C 47/0014* (2013.01); *B29C 47/0066* (2013.01); *B29C 47/30* (2013.01); *B29C 47/8815* (2013.01); *B29B 9/16* (2013.01); *B29K 2101/12* (2013.01); *B29K 2995/0056* (2013.01)

(58) Field of Classification Search
  CPC . B29B 2009/166; B29B 9/16; B29C 47/0011; B29C 47/0014; B29C 47/0023; B29C 47/0066; B29C 47/882; B29C 47/8895; B29C 47/8815; B29C 47/30; B29C 47/0028; B29K 2101/12; B29K 2995/0056; A01N 25/12; B01J 20/00; B22F 9/08; C22B 1/14; C22B 1/24; C22B 1/2406; C08J 3/12
  See application file for complete search history.

(56)    References Cited

U.S. PATENT DOCUMENTS

| | | | |
|---|---|---|---|
| 3,191,413 A | | 6/1965 | Stulen |
| 3,402,682 A | * | 9/1968 | Peden .................. A21C 11/16 425/380 |
| 3,409,941 A | * | 11/1968 | Poux .................. B29C 47/0023 425/192 R |
| 3,516,120 A | * | 6/1970 | Siegfried ................ B29B 9/065 425/311 |
| 3,924,988 A | * | 12/1975 | Hodge .................. D01D 4/02 264/177.14 |
| 4,063,919 A | * | 12/1977 | Grano, Jr. ............ C05G 3/0052 47/48.5 |
| 4,123,207 A | | 10/1978 | Dudley |
| 4,204,821 A | | 5/1980 | Gauchel et al. |
| 4,251,198 A | | 2/1981 | Altenburg |
| 4,500,271 A | | 2/1985 | Smith |
| 4,621,996 A | * | 11/1986 | Hundley, III .......... B29B 9/065 425/190 |
| 4,655,987 A | * | 4/1987 | Zertuche ............. B29C 47/0023 264/209.1 |
| 4,728,176 A | | 3/1988 | Tsuboyama et al. |
| 4,728,276 A | | 3/1988 | Pauley et al. |
| 4,752,205 A | | 6/1988 | Moriyama et al. |
| 4,764,100 A | * | 8/1988 | Lambertus ............. B29B 9/065 264/142 |
| 4,888,990 A | | 12/1989 | Bryan et al. |
| 5,059,103 A | | 10/1991 | Bruckmann et al. |
| 5,073,102 A | * | 12/1991 | Guggiari .................. B29B 9/06 425/461 |
| 5,332,585 A | * | 7/1994 | Odermatt .............. A23L 1/0023 426/516 |
| 5,391,694 A | * | 2/1995 | Duh ....................... C08G 63/80 264/143 |
| 5,403,176 A | | 4/1995 | Bruckmann et al. |
| 5,409,662 A | * | 4/1995 | Hirai .......................... B22F 3/20 29/893 |
| 5,624,688 A | | 4/1997 | Adams et al. |
| 6,332,765 B1 | | 12/2001 | Spelleken |
| 6,551,087 B1 | | 4/2003 | Martin |
| 6,586,031 B1 | | 7/2003 | Kelly |
| 6,669,986 B1 | * | 12/2003 | Mushiake ................. B29B 9/06 264/143 |
| 6,793,473 B1 | | 9/2004 | Fridley |
| 6,824,371 B2 | | 11/2004 | Smit |
| 6,925,741 B2 | | 8/2005 | Eloo et al. |
| 7,033,152 B2 | | 4/2006 | Eloo et al. |
| 7,157,032 B2 | | 1/2007 | Eloo |
| 7,171,762 B2 | | 2/2007 | Roberts et al. |
| 7,172,397 B2 | | 2/2007 | Fridley |
| 7,318,719 B2 | | 1/2008 | Fridley |
| 7,402,034 B2 | | 7/2008 | Fridley |
| 7,421,802 B2 | | 9/2008 | Roberts et al. |
| 7,524,179 B2 | | 4/2009 | Fridley |
| 7,771,635 B2 | | 8/2010 | Boothe et al. |
| 8,007,701 B2 | | 8/2011 | Mann et al. |
| 8,011,912 B2 | | 9/2011 | Mann et al. |
| 8,080,196 B2 | | 12/2011 | Martin et al. |
| 8,205,350 B2 | | 6/2012 | Aaron et al. |
| 8,220,177 B2 | | 7/2012 | Bryan |
| 8,303,871 B2 | | 11/2012 | Booth et al. |
| 8,361,364 B2 | | 1/2013 | Eloo et al. |
| 8,366,428 B2 | | 2/2013 | Eloo |
| 8,444,923 B2 | | 5/2013 | Persinger et al. |
| 8,512,021 B2 | | 8/2013 | Broughtman |
| 8,562,883 B2 | | 10/2013 | Thepsimuang et al. |
| 8,671,647 B2 | | 3/2014 | Boothe et al. |
| 8,708,688 B2 | | 4/2014 | Fridley |
| 8,834,760 B2 | * | 9/2014 | Martin ..................... B29B 9/06 264/140 |
| 9,067,340 B2 | * | 6/2015 | Hehenberger ............ B29B 9/06 |
| 2004/0206246 A1 | * | 10/2004 | Bortone ............... A21C 11/163 99/353 |
| 2005/0220920 A1 | | 10/2005 | Fridley |
| 2006/0068052 A1 | * | 3/2006 | Remili ..................... B01J 2/20 425/308 |
| 2006/0165834 A1 | | 7/2006 | Fridley |
| 2008/0029937 A1 | * | 2/2008 | Gielenz ............... B29C 47/0014 264/555 |
| 2008/0160124 A1 | * | 7/2008 | Ohigawa .......... A61M 25/0009 425/131.1 |
| 2009/0206507 A1 | | 8/2009 | Martin et al. |
| 2010/0040716 A1 | | 2/2010 | Fridley |
| 2010/0117258 A1 | * | 5/2010 | Brazier .................... B01J 19/30 264/150 |
| 2011/0135851 A1 | * | 6/2011 | Dozeman .................. B29B 9/06 428/17 |
| 2011/0291318 A1 | * | 12/2011 | Martin ..................... B29B 9/06 264/150 |
| 2012/0000161 A1 | | 1/2012 | Free et al. |
| 2012/0084993 A1 | | 4/2012 | Martin et al. |
| 2012/0298475 A1 | | 11/2012 | Patton et al. |
| 2012/2280419 | | 11/2012 | Wayne et al. |
| 2013/0036714 A1 | | 2/2013 | Bolton et al. |
| 2013/0071491 A1 | * | 3/2013 | Berrios ................. A23L 1/3016 424/655 |

FOREIGN PATENT DOCUMENTS

| | | |
|---|---|---|
| DE | 8701490.4 | 7/1987 |
| DE | 3702841 | 8/1987 |
| DE | 19642389 | 4/1997 |
| DE | 19651354 | 6/1997 |
| DE | 29624638 U1 | 4/2006 |
| EP | 0687544 A1 | 12/1995 |
| EP | 1582327 | 10/2005 |
| EP | 1218156 | 2/2007 |
| EP | 2008784 A1 | 12/2008 |
| JP | 5232958 A | 3/1977 |
| JP | 10191948 | 7/1998 |
| JP | 2000033256 A | 2/2000 |
| KR | 100329334 A1 | 11/2002 |
| WO | 2006081140 | 8/2006 |
| WO | 2006087179 | 8/2006 |
| WO | 2007064580 | 6/2007 |

OTHER PUBLICATIONS

International Search Report dated Dec. 3, 2014 for related PCT Patent Application No. PCT/US14/055583.

(56) References Cited

OTHER PUBLICATIONS

Notification of First Office Action dated Oct. 10, 2012, issued by the State Intellectual Property Office of the P.R. China for related Chinese Patent Application No. 2009801163944.

International Search Report and Written Opinion issued by the Korean Intellectual Property Office dated Dec. 30, 2009 for related PCT Application No. PCT/US2009/044220.

* cited by examiner

METHOD AND DEVICE FOR EXTRUSION OF HOLLOW PELLETS

CROSS-REFERENCE TO RELATED APPLICATION

The present application claims priority from, and is a Continuation-in-Part of U.S. patent application Ser. No. 12/993,062, having a 35 U.S.C. §371(c) date of Dec. 15, 2010, entitled "Method and Device for Extrusion of Hollow Pellets," which claims the benefit of International Patent Application Serial Number PCT/US2009/044220, filed May 15, 2009, entitled "Method and Device for Extrusion of Hollow Pellets," which claims the benefit of U.S. Provisional Patent Application Ser. No. 61/053,984, filed May 16, 2008, entitled "Method and Device for Extrusion of Hollow Pellets," all of which are hereby incorporated by reference in their entirety as if fully set forth below.

BACKGROUND OF THE INVENTION

1. Field of the Invention

The present invention relates generally to an extrusion process to produce hollow pellets, wherein an insert is placed in the die holes of an extrusion die, about which is extruded the molten material to form those hollow pellets.

2. Description of Related Art

Pelletization equipment and its use following extrusion processing has been introduced and/or utilized in applications by the assignee for many years as is exemplified by disclosures including U.S. Pat. Nos. 4,123,207; 4,251,198; 4,500,271; 4,621,996; 4,728,276; 4,888,990; 5,059,103; 5,403,176; 5,624,688; 6,332,765; 6,551,087; 6,793,473; 6,824,371; 6,925,741; 7,033,152; 7,157,032; 7,171,762; 7,172,397; 7,318,719; 7,402,034; 7,421,802; 7,524,179; 7,771,635; 8,007,701; 8,011,912; 8,080,196; 8,205,350; 8,220,177; 8,303,871; 8,361,364; 8,366,428; 8,444,923; 8,512,021; 8,562,883; 8,671,647; and 8,708,688; U.S. Patent Application Publication Nos. 2012/0084993; 2012/0280419; 2012/0000161; 2013/0036714; 2012/0298475; and 2009/0206507; U.S. patent application Ser. No. 14/198,270; German Patents and Applications including DE 32 43 332, DE 37 02 841, DE 87 01 490, DE 196 42 389, DE 196 51 354, and DE 296 24 638; and European Patents and Applications including EP 1 218 156, EP 1 582 327, and EP 2 008 784. These patents and applications are all owned by the assignee and are included herein by way of reference in their entirety.

These disclosures remain silent as to the use of inserts in the pelletization process. More specifically, these disclosures remain silent regarding the use of inserts in the extrusion die, wherein molten material flows about the extrusion die and the insert such that a hollow pellet is generated.

The various embodiments of the present invention provide a cost effective method to prepare reproducible hollow pellets by use of a multiplicity of inserts in an equivalent multiplicity of die orifices through an extrusion die plate.

BRIEF SUMMARY OF THE INVENTION

Briefly described, the various embodiments of the present invention provide a process to extrude hollow pellets by use of at least one insert through at least one die orifice in an extrusion die. Molten material passes to, and through, the die orifice containing the insert. The molten material is extruded, preferably with pressure, to give a hollow pellet on cooling, such that the hollow cavity formed can be at least one of continuously hollow throughout the pellet, completely and circumferentially enclosed within the pellet, and many combinations there between such that the enclosed hollow cavity is at least perforatedly connected in at least one locus to the outside of the pellet.

The hollow pellets are reproducible in structure and can be of any molten material, preferably polymeric, and any geometry both from the pellet shape, as well as the hollow cavity shape. The hollow pellet obtained is dependent upon, but not limited to, the extrusion viscosity, die swell, material composition, temperature of the melt, rate of cooling, degree of crystallization, melt index, cutting speed of the pelletization process, and the like.

It is, therefore, an aspect of the present invention to provide an inexpensive and cost effective method to produce relatively consistent and reproducible hollow pellets utilizing at least one insert in at least one orifice of an extrusion die about which the molten material is extruded such that the pellet shape, pellet diameter, cavity shape, cavity diameter, and penetration of that cavity or the lack thereof in and/or through the pellet is controlled.

Embodiments of the present invention can comprise an extrusion process for producing hollow pellets comprising extruding molten material through an extrusion die and cooling the extruded molten material effective to produce a pellet having a hollow cavity. The extrusion die can be a single-body extrusion die, a removable insert extrusion die assembly, or other structure. In some cases, the extruding can be implemented using pressure. The extrusion die may comprise a die hole and an insert disposed in the die hole. The insert may comprise a rear section and a forward section. In some embodiments, the rear section may comprise a hollow can. The can, in some embodiments, may have a hollow cavity therein. In some embodiments, the forward section may comprise a mandrel. The mandrel, in some embodiments, may comprise a plurality of fins that maintain the position of the mandrel in the die hole as the molten material is extruded.

In some embodiments, the molten material may flow through the hollow can. In some embodiments, the molten material may pass through at least one hole disposed between the hollow can and the fins of the mandrel.

In some embodiments, the fins may comprise protrusions that abut the die hole to maintain the position of the mandrel as the molten material flows around the fins. In some embodiments, at least one of the fins of the mandrel may be tapered. In some embodiments, the mandrel can further comprise a protrusion to squeeze the molten material into a single, uniform flow.

In some embodiments, the can may be threaded. In some embodiments, the mandrel may be a removable mandrel, and the mandrel may be threadedly attached to the can.

In certain embodiments, the hollow cavity of the pellet can penetrate a first surface of the pellet and continuously extend through a second surface of the pellet. Alternatively, the hollow cavity may be encapsulated completely within the pellet. It is also possible for the hollow cavity to penetrate a first surface of the pellet and extend inwardly to an interior portion of a body of the pellet. If a pellet has more than one hollow cavity, any one or more of these types of hollow cavities may be incorporated into the pellet.

In some embodiments, the molten material used for making the hollow pellets may be chosen from polymers, copolymers, bio-polymers and bio-plastics, and combinations thereof. One or more additives may also be included along with the molten material. The polymers, copolymers, and additives may contain reactive functionalities, which can be cross-linkable. The reactive functionalities may be modified by chemical reaction, including by expansion.

Embodiments of the present invention may further comprise an extrusion process for producing hollow pellets that involves feeding a molten material into a pelletizer and extruding the molten material through an extrusion die of the pelletizer such that during extrusion the molten material may flow through the hollow can of an insert, through at least one hole of the insert, and around fins disposed on the mandrel of the insert. In some embodiments, the pelletizer may be an under fluid pelletizer, such as, for example, an underwater pelletizer. In some embodiments, after the molten material flows around the fins, the molten material may flow around a portion of the insert that does not have fins.

In some embodiments, the insert may comprise a taper between a back edge of the insert and the hollow can, and the molten material may then flow through the taper.

In some embodiments, the process may further comprise cooling the extruded molten material effective to produce a pellet having a hollow cavity. In some embodiments, the hollow cavity of the pellet may penetrate a first surface of the pellet and continuously extend through a second surface of the pellet. Alternatively, the hollow cavity may be encapsulated completely within the pellet. It is also possible for the hollow cavity to penetrate a first surface of the pellet and extend inwardly to an interior portion of a body of the pellet. If a pellet has more than one hollow cavity, any one or more of these types of hollow cavities may be incorporated into the pellet.

Embodiments of the present invention may further comprise a pelletizer. The pelletizer may comprise an inlet for receiving a molten material, a die hole for extruding the molten material that may be downstream of the inlet, and an insert disposed in the die hole. In some embodiments, the insert may comprise a rear section and a forward section. In some embodiments, the rear section may comprise a hollow can, and the can may have a hollow cavity therein. In some embodiments, the forward section may comprise a mandrel, and the mandrel may comprise a plurality of fins. In some embodiments, the insert may comprise at least one hole configured to enable the molten material to flow from the hollow can to the mandrel.

In some embodiments, the plurality of fins may comprise protrusions that maintain the position of the mandrel in the die hole as the molten material is extruded. In some embodiments, the region of the mandrel furthest from the rear section of the insert may not comprise fins.

In some embodiments, the extruded molten material may comprise a pellet having a hollow cavity. In some embodiments, the pelletizer may also comprise an outlet for transporting the extruded molten material from the pelletizer. The pelletizer can be an under fluid pelletizer, such as an underwater pelletizer.

These and other objects, features, and advantages of the present invention will become more apparent upon reading the following detailed description in conjunction with the accompanying drawings.

BRIEF DESCRIPTION OF THE DRAWINGS

FIG. 5a is a horizontal cross-sectional view of the insert of FIG. 4 in the die hole at line a.

FIG. 6c is a front perspective view of the insert of FIG. 6a.

FIG. 9b illustrates a cross-sectional view of the hollow approximately cylindrical pellet from FIG. 9a.

FIG. 9c illustrates a side view of the hollow approximately cylindrical pellet from FIG. 9a.

FIG. 9d illustrates a top view of an approximately round pellet.

FIG. 9e illustrates the cross-section through the round pellet in FIG. 9d.

FIG. 9f illustrates a top view of an approximately rectangular pellet.

FIG. 9g illustrates a cross-sectional view through the pellet in FIG. 9f showing a round hollow or cavity within that rectangular pellet.

FIG. 9h illustrates a top view of an approximately round pellet.

FIG. 9i illustrates a cross-sectional view through the pellet in FIG. 9h wherein a cavity has perforations into and through the pellet wall.

DETAILED DESCRIPTION

Figure 1:
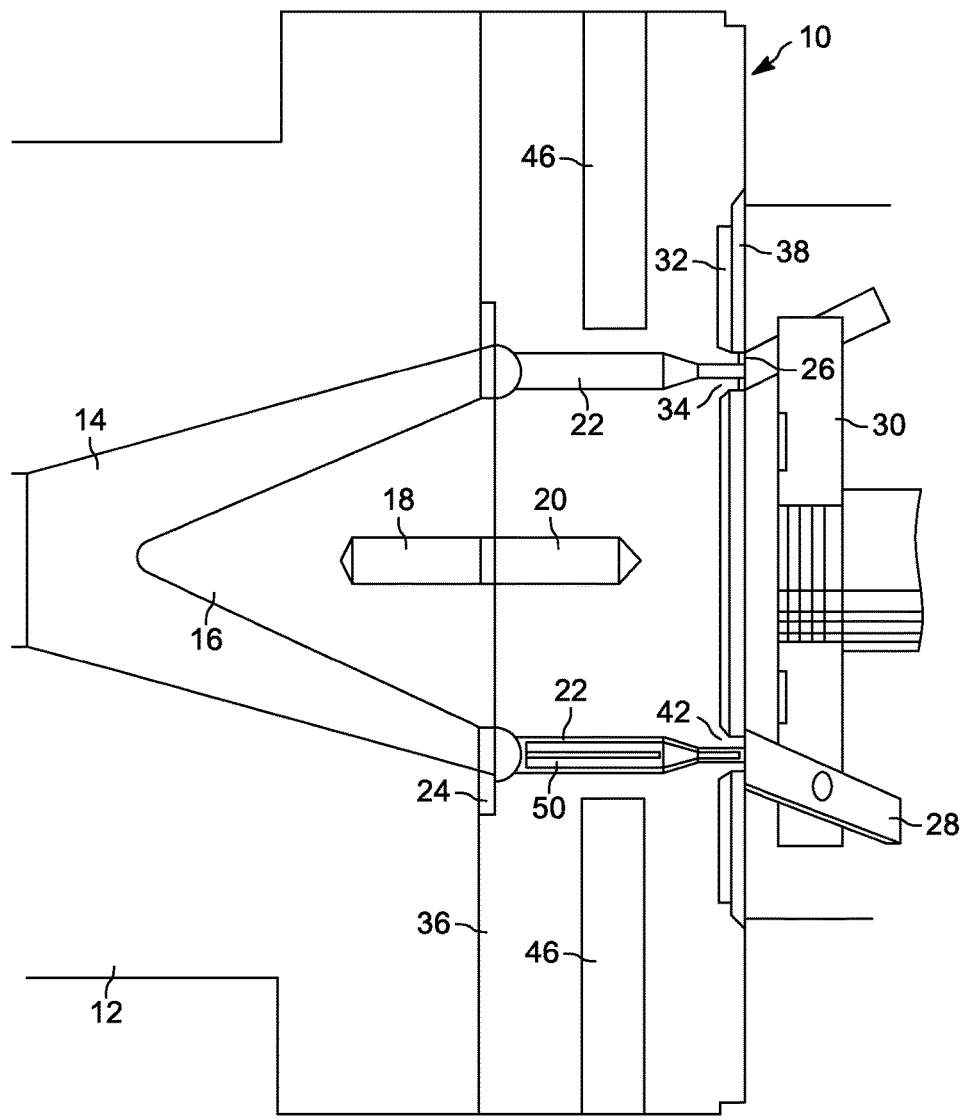
FIG. 1 is a schematic vertical sectional view of one embodiment of the single-body extrusion die assembly of the present invention in which the perforated is of single-body construction.

Although only certain embodiments of the invention are explained in detail, it is to be understood that the invention is not limited in its scope to the details of construction and arrangement of components set forth in the following description or illustrated in the drawings. The invention is capable of other embodiments and of being practiced or carried out in various ways. Also, in describing these embodiments, specific terminology will be resorted to for the sake of clarity. It is to be understood that each specific term includes all technical equivalents that operate in a similar manner to accomplish a similar purpose.

Referring to the drawings, FIG. 1 illustrates one embodiment of the present invention associated with components of a pelletizer. The pelletizer includes an inlet housing 12 from a melting and/or mixing apparatus (not shown). The inlet housing 12 includes a passageway 14 for molten material or other extrudate (hereinafter collectively referred to as "process melt") that can include organic materials, oligomers, polymers, waxes, and combinations thereof without intending to be limited. Nose cone 16 directs the process melt to the upstream side of the single-body extrusion die 10 to which it is attachedly connected by a threaded rod (not shown). The threaded rod is screw-threaded at one end into threaded bore 18 of nose cone 16 and, at its distal end, into threaded bore 20 of single-body extrusion die 10. Alternately, the nose cone 16 can be continuous with the single-body extrusion die 10 and need not be attachedly connected as herein described.

The single-body extrusion die 10 contains at least one and, preferably, a multiplicity of die holes 22, concentrically arranged singly or in multiples thereof in at least one ring, that extend from the upstream face 24 to the downstream face 26 of single-body extrusion die 10. A plurality of knife blade assemblies 28 mounted on a rotatably driven cutter hub 30 in a cutting chamber (not shown) cuts the extruded, cooled, and at least partially solidified process melt into pellets. The pellets thusly formed are transported mechanically, pneumatically, hydraulically, and in combinations thereof to downstream processing.

Areas of the downstream face 26 optionally can be cut out to provide at least one annular recess or cavity 32 peripherally adjacent to the die holes 22 such that the die holes 22 are contained in protrusions 34 that are continuous with the base plate 36 of single-body extrusion die 10. Within die holes 22, with or without protrusions 34, are an equivalent number of inserts 50 detailed herein below. Annular cover plate 38 overlays the annular recess or cavity 32 and is attachedly connected to base plate 36 and protrusions 34 by brazing, welding, or similar technique known to those skilled in the art. The cover plate 38 can be at least one of an abrasion and corrosion resistant metal, preferably nickel steel, a hard face material, preferably tungsten carbide, and many combinations thereof. Similarly, attachment of the cover plate 38 to the base plate 36 and/or protrusions 34 is preferably achieved by welding, brazing, and the like. The surface of the cover plate 38 and, therefore, the downstream face 26 of single-body extrusion die 10 can optionally be coated with a chemical, abrasion, corrosion, and wear resistant coating as is known to those skilled in the art.

Figure 2:
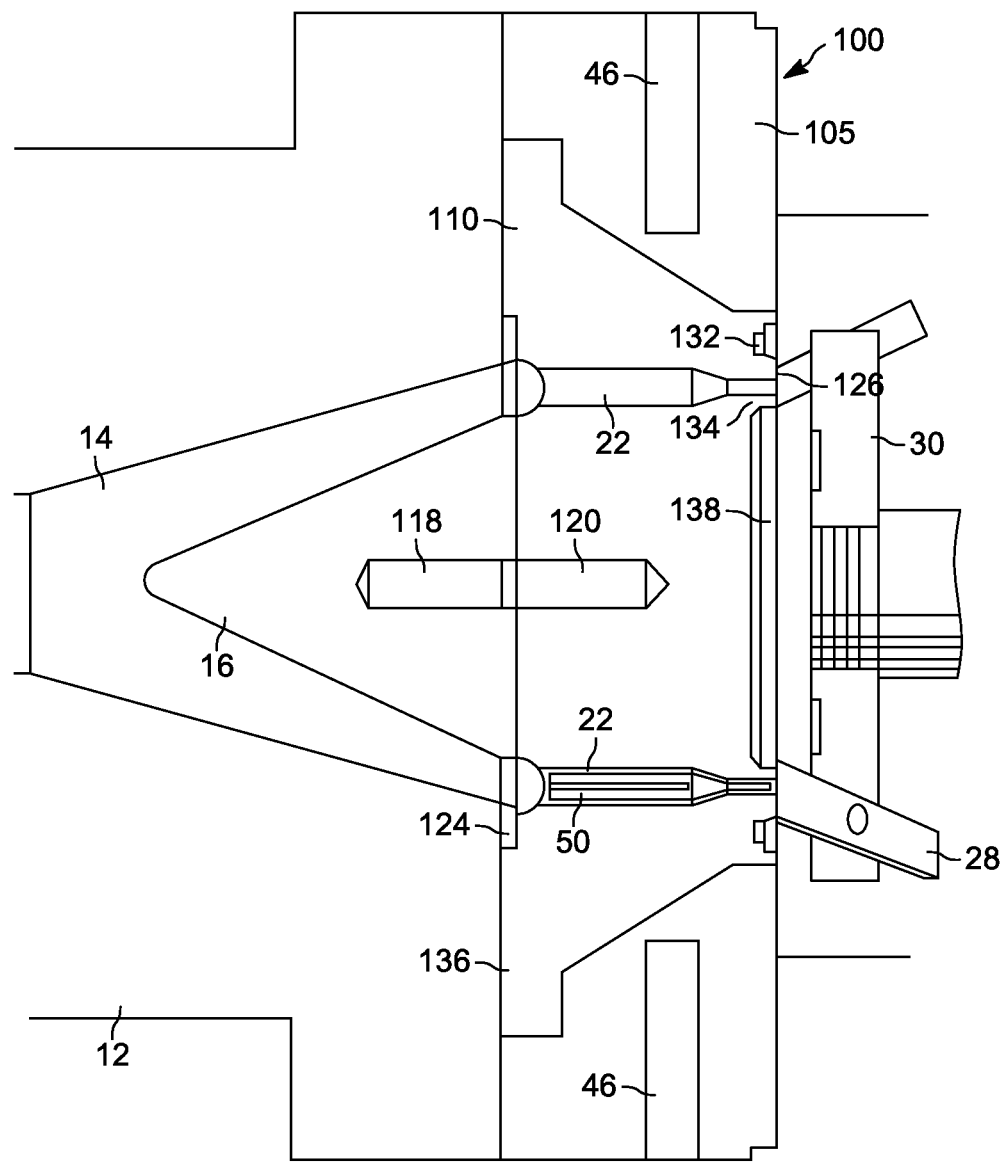
FIG. 2 is a schematic vertical sectional view of a removable insert extrusion die assembly of the present invention in which the perforated is of removable center construction.

FIG. 2 illustrates a removable insert extrusion die assembly 100 in a second embodiment of the present invention. Removable insert extrusion die assembly 100 is comprised of base plate 105 and removable insert 110. Similarly to FIG. 1, the removable insert extrusion die assembly 100 is attachedly connected to an inlet housing 12 from a melting and/or mixing apparatus (not shown). The inlet housing 12 includes a passageway 14 for process melt as heretofore described. Nose cone 16 directs the process melt to the upstream side of the removable insert 110 to which it is attachedly connected by threaded rod (not shown). The threaded rod is screw threaded at one end into threaded bore 118 of nose cone 16 and at its distal end into threaded bore 120 of removable insert 110.

The removable insert 110 contains at least one and, preferably, a multiplicity of die holes 22 concentrically arranged singly or in multiples thereof in at least one ring that extend from the upstream face 124 to the downstream face 126 of removable insert 110. A plurality of knife blade assemblies 28 mounted on a rotatably driven cutter hub 30 in a cutting chamber (not shown) cuts the extruded, cooled, and at least partially solidified process melt into pellets. The pellets thusly formed are transported mechanically, pneumatically, hydraulically, and in combinations thereof to downstream processing as before.

Areas of the downstream face 126 optionally can be cut out to provide at least one annular recess or cavity 132 peripherally adjacent to the die holes 22 such that the die holes 22 are contained in protrusions 134 that are continuous with the removable center base plate 136 of removable insert 110. Within die holes 22, with or without protrusions 134, are an equivalent number of inserts 50 detailed herein below. Annular cover plate 138 overlays the annular recess or cavity 132 and is attachedly connected to removable center base plate 136 and protrusions 134 by brazing, welding, or similar technique known to those skilled in the art. The cover plate 138 can be at least one of an abrasion and corrosion resistant metal, preferably nickel steel, a hard face material, preferably tungsten carbide, and many combinations thereof. Similarly, attachment of the cover plate 138 to the removable center base plate 136 and/or protrusions 134 is preferably achieved by welding, brazing, and the like. The surface of the cover plate 138 and, therefore, the downstream face 126 of removable insert 110 can optionally be coated with a chemical, abrasion, corrosion, and wear resistant coating as is known to those skilled in the art.

Heating and/or cooling processes can be provided by electrical resistance, induction, steam or heat transfer fluid as has been conventionally disclosed for the single-body extrusion die 10, as well as the removable insert extrusion die assembly 100. The removable insert 110 and the base plate 105 alternatively can be heated separately by similar or differing mechanisms. Preferably, heating elements 46 are inserted into the single-body extrusion die 10 or the removable insert extrusion die assembly 100 as illustrated in FIGS. 1 and 2, respectively. Other designs as are known to those skilled in the art are included herein by way of reference without intending to be limited.

Figure 3:
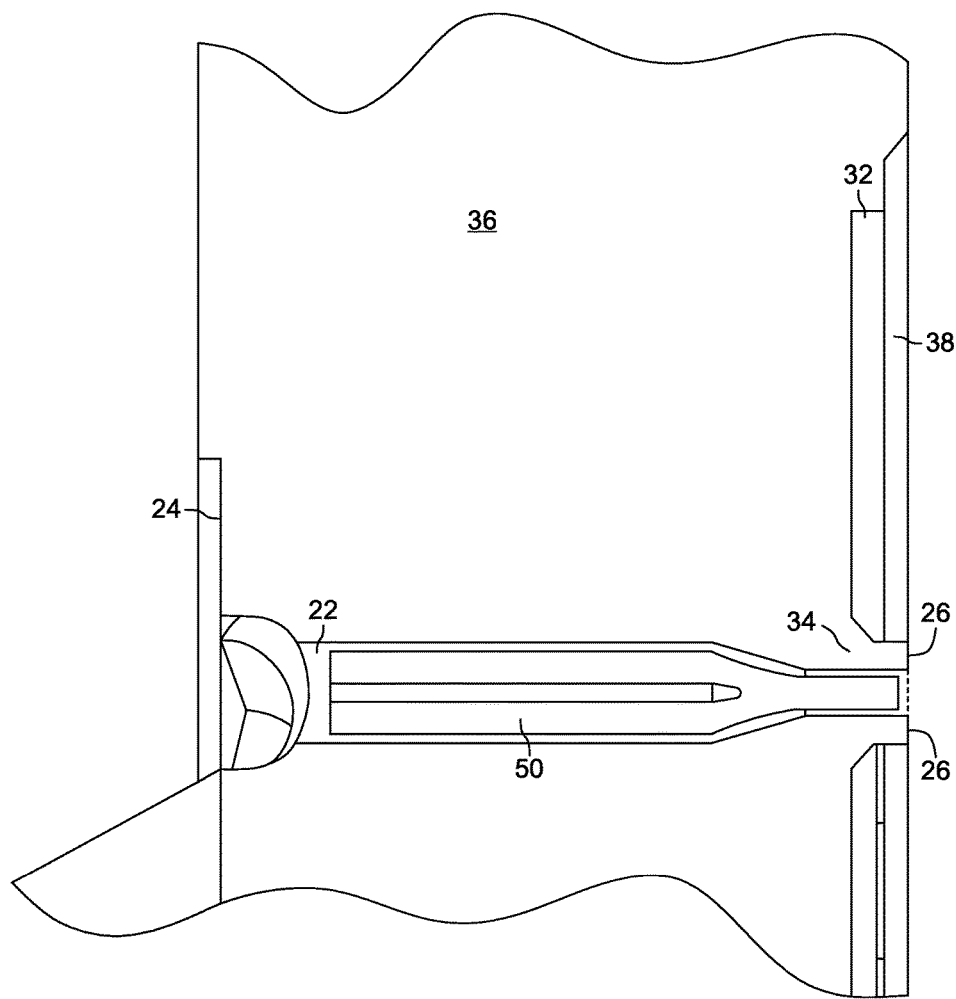
FIG. 3 is a schematic vertical sectional view illustrating the association of the die orifice and insert.

Turning now to FIG. 3 for the single-body extrusion die 10, insert 50 is illustrated within die hole 22 that extends from upstream face 24 into and through optional protrusion 34 in base plate 36 to downstream face 26 of cover plate 38. Optional annular recess or cavity 32 is also shown for purposes of clarification. An analogous assembly follows for removable insert 110 and is not shown.

Figure 4:
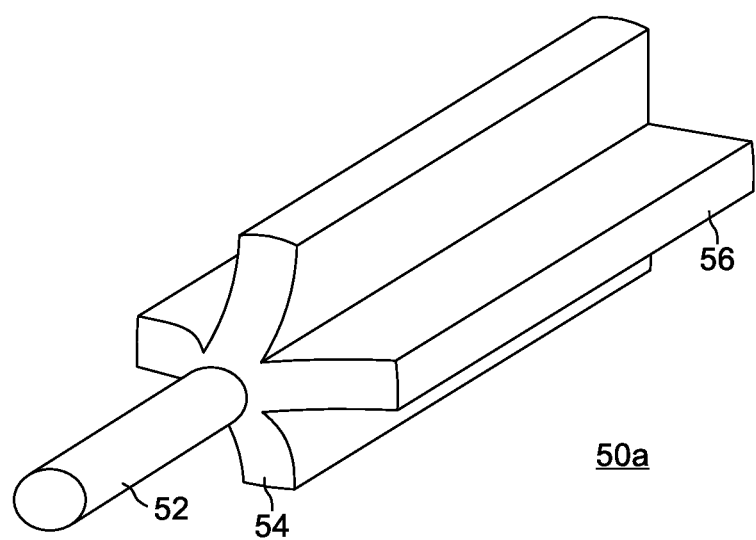
FIG. 4 is a schematic view of one embodiment of the insert.

FIG. 4 illustrates the details of construction for one embodiment of insert 50. As seen in FIG. 4, insert 50a comprises a mandrel 52, a multiplicity of insert fin tapers 54, and a multiplicity of fins 56. The insert 50a can be made of any abrasion-resistant material and is preferably metal. The metal can be aluminum, brass, bronze, copper, steel, tool steel, carbon steel, vanadium steel, stainless steel, nickel steel, nickel, and the like without intending to be limited. More preferably the metal is a good heat conductor including brass, bronze, and copper. Without intending to be bound by any theory, it is believed that the thermally conductive metals maintain uniformity of temperature in the process melt propagating into and through the die hole 22. This is effective in minimizing loss of heat and/or variation in temperature as the material flows in the multiplicity of pathways formed by the multiplicity of fins 56.

The dimensions of insert 50a must be such that it does not exceed the dimensions of die hole 22 at process temperature and must take into consideration the differential expansion wherein the metal of insert 50a differs from that of base plate 36 or removable insert 110. Fins 56 not only form a multiplicity of flow pathways for the process melt, but also further serve to maintain the position of insert 50*a* in die hole 22. The minimum number of fins is at least two and, preferably, at least three. More preferably, there are at least four fins 56 on insert 50*a*. The multiplicity of fins 56 can be oriented at any angle relative to the adjacent fins to form pathways through which flows the polymer melt. Preferably, the fins are 180 degrees apart or less. More preferably, the fins are 120 degrees or less apart. Most preferably, the fins are 90 degrees or less apart. As a result, in some cases, the insert has at least four fins disposed about insert 50*a* such that each of the at least four fins is disposed less than or equal to about 90 degrees apart from an adjacent fin.

Figure 5:
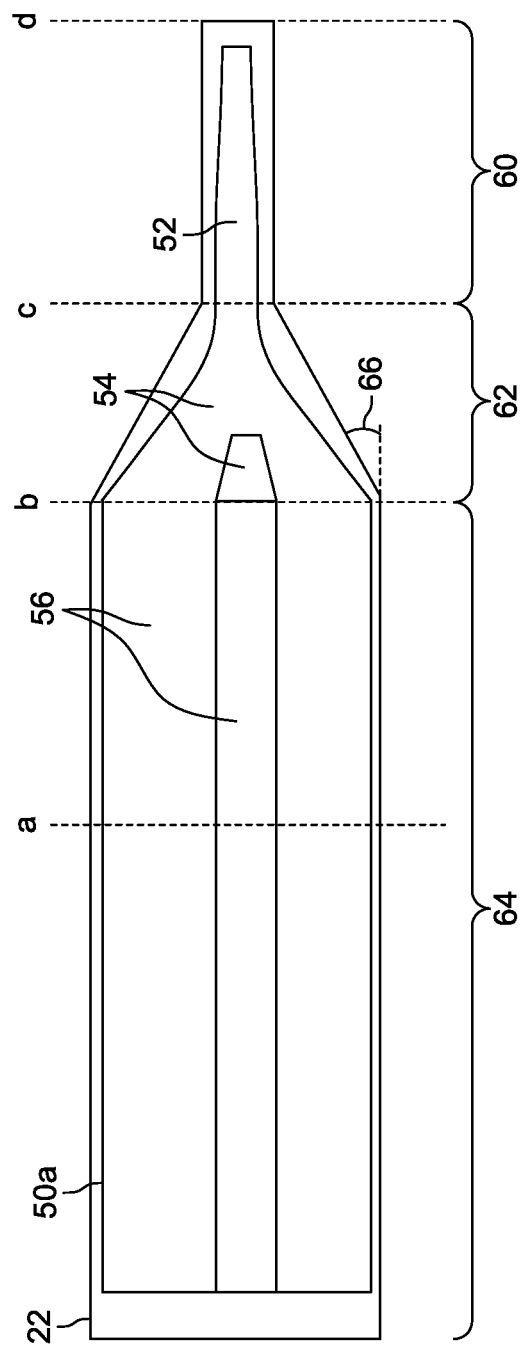
FIG. 5 is a cross-sectional view of the insert of FIG. 4 in the die hole.

FIG. 5 shows insert 50*a* within die orifice or hole 22. As seen therein, mandrel 52 is significantly contained within die land 60, insert fin tapers 54 approximately correspond dimensionally to die hole taper 62, and fins 56 are approximately contained within pre-land tube 64. The length of die land 60 typically ranges from at least approximately 3.8 millimeters (approximately 0.15 inch) to approximately 31.75 millimeters (approximately 1.25 inches) and is preferably at least approximately 6.4 millimeters (approximately 0.25 inch) to approximately 25 millimeters (approximately 1.00 inch). Mandrel 52 within die land 60 is preferably flush with downstream face of the extrusion die. In an alternative embodiment, the length of mandrel 52 may be less than the length of die land 60. In such an alternative embodiment, the length of mandrel 52 is no more than about 0.50 millimeters (approximately 0.020 inch) to about 5.0 millimeters (approximately 0.20 inch) less than the length of die land 60, thereby making the tip of mandrel 52 very slightly recessed from the downstream face of the extrusion die. Die land 60 and/or mandrel 52 can be cylindrical or tapered and can be round, oval, rectangular, and the like in geometry. Similarly, die land 60 and mandrel 52 can be of similar or different geometry. Insert 50*a* can be press fit and preferably is slide fit into die hole 22.

The insert fin tapers 54 are similar in angularity, at angle 66, to die hole taper 62 that can range from 0° to 90° as measured from the perpendicular cylinder imposed on the diameter of pre-land tube 64 at the juncture with die hole taper 62. Preferably angle 66 ranges from 15° to 45° as described herein. The insert fin tapers 54 can be the same contour as, or different than, that of die hole taper 62 and dimensionally must taper from the diameter of fins 56 to the diameter of mandrel 52. Similarly, fins 56 can be similar to the geometry, cylindrical or tapered and combinations thereof for example, of pre-land tube 64 or can be different in geometry. Preferably, pre-land tube 64 and fins 56 are cylindrical. The length of fins 56 can be the same as the length of pre-land tube 64, but is preferably less than the length of pre-land tube 64. More preferably, the length of fins 56 is at least approximately 0.50 millimeters (approximately 0.020 inch) less than the length of pre-land tube 64 such that the fins do not protrude outside the length of pre-land tube 64.

Figure 5B:
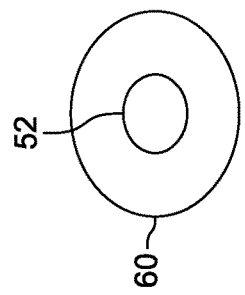
FIG. 5b is a horizontal cross-sectional view of the insert of FIG. 4 in the die hole at line b.
Figure 5D:
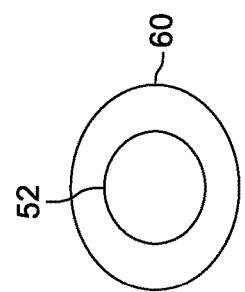
FIG. 5d is a horizontal cross-sectional view of the insert of FIG. 4 in the die hole at line d.
Figure 5A:
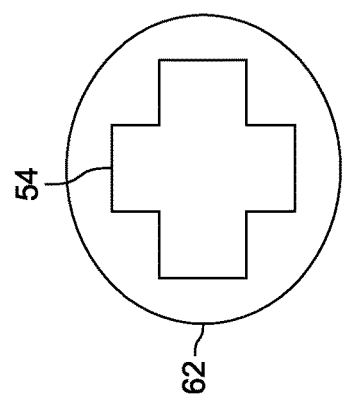
Figure 5C:
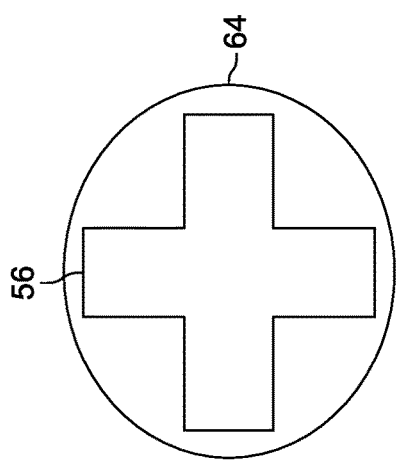
FIG. 5c is a horizontal cross-sectional view of the insert of FIG. 4 in the die hole at line c.

FIG. 5*a* illustrates an exemplary cross-sectional design of fins 56 in pre-land tube 64 at line a. FIG. 5*b* illustrates an exemplary cross-section design of insert fin tapers 54 in die hole taper 62 at line b. FIG. 5*c* illustrates an exemplary cross-sectional design of mandrel 52 at the attachment point to insert fin tapers 54 in die land 60 at line c. FIG. 5*d* illustrates an optional decreasingly tapered mandrel 52 in die land 60 at line d.

Figure 6A:
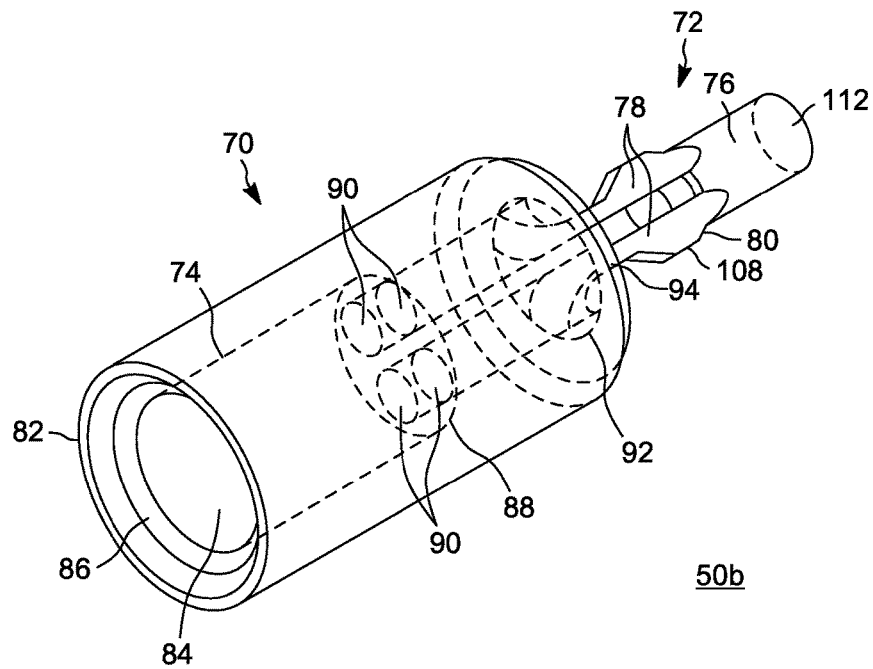
FIG. 6a is an elevated back perspective view of a second embodiment of the insert.
Figure 6B:
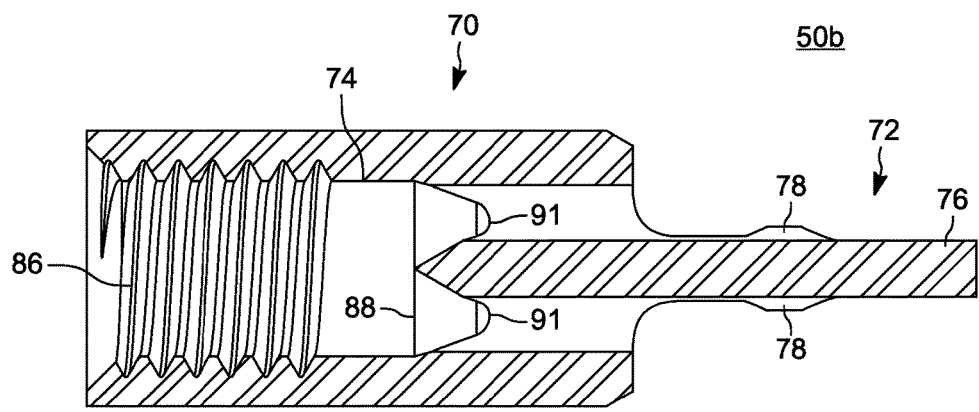
FIG. 6b is a side perspective view of an alternative embodiment of the insert.
Figure 6C:
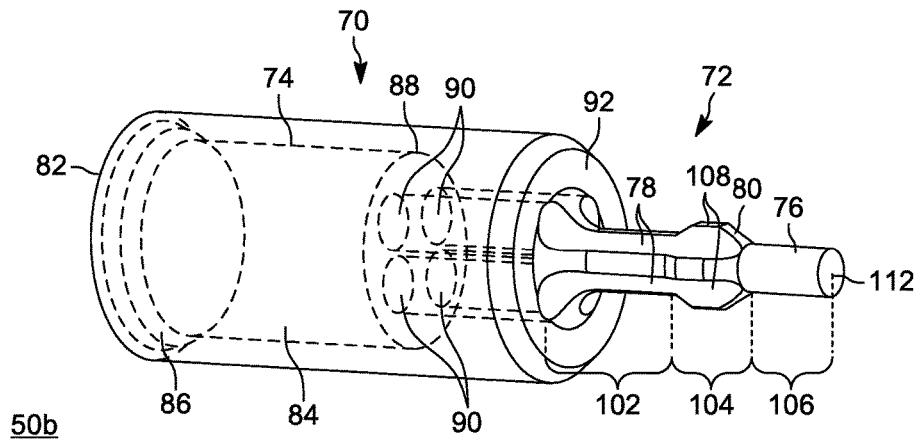

FIGS. 6*a*-6*c* illustrate the details of construction for alternative embodiments of insert 50. Referring first to FIG. 6*a*, insert 50*b* comprises rear section 70 and forward section 72. Rear section 70 comprises can 74. Forward section 72 comprises mandrel 76, which comprises a plurality of fins 78 and a plurality of fin tapers 80. Can 74 in rear section 70 of insert 50*b* includes a back edge 82 and a hollow cavity 84. Back edge 82 is open so as to receive the process melt therein. Between back edge 82 and hollow cavity 84 is an optional thread 86. Thread 86 may be used to take insert 50*b* out of or place it in die hole 22 by, for example, inserting a tool into thread 86 so as to grab insert 50*b* for removal from or placement within die hole 22. A useful feature of this optional thread is the flexibility to be able, with minimum investment, to switch the pelletizing operation from producing hollow pellets to normal, non-hollow (solid) pellets and back again.

The hollow cavity 84 of can 74 includes a front wall 88. Front wall 88 may be flat, as shown in FIG. 6*a*. Front wall 88 includes at least one hole 90. Front wall 88 can also include at least two holes 90, at least three holes 90, or at least four holes 90. In the alternative, rather than front wall 88 being flat, the region comprises a plurality of tapered inlets 91, as shown in FIG. 6*b*. Tapered inlets 91 help funnel the molten material into at least one hole 90 and also help prevent material build up at front wall 88.

Referring back to FIG. 6*a*, at least one hole 90 originates in front wall 88 of hollow cavity 84 and extends to front wall 92 of rear section 70 of insert 50*b*. The at least one hole 90 enables the process melt to flow from hollow cavity 84 and to be fed toward forward section 72 of insert 50*b* without obstructing the flow of the process melt or causing an unnecessary pressure increase. The front wall 92 may optionally include a chamfer 94.

FIG. 6*c* is a front perspective view of insert 50*b*, showing more clearly forward section 72 of insert 50*b*, which includes mandrel 76, plurality of fins 78 on mandrel 76, and plurality of fin tapers 80. Mandrel 76 has at least three distinct regions, preferably, a base region 102, a middle region 104, and a forward region 106. In base region 102, fins 78 extend forward along mandrel 76 from front wall 92 of rear section 70 toward forward region 106 and the downstream face of the extrusion die. This allows the process melt to come through the at least one hole 90 and maintain constant laminar or other desirable flow through the at least one hole 90 and along fins 78. Fins 78 act as guides for the process melt without obstructing the flow of the process melt. In middle region 104, fins 78 have protrusions 108. Fins 78 terminate at fin tapers 80 within the middle region of mandrel 76. Insert fin tapers 80 dimensionally taper from the diameter of fins 78 to the diameter of mandrel 76 without fins 78. Forward region 106 of mandrel 76 can, therefore, be devoid of fins. The lack of fins in forward region 106 can enable the process melt to flow around the forward region 106 of mandrel 76 so that when the process melt is extruded out of die hole 22, the resulting hollow pellets can be completely formed, without gaps, as might be caused if the fins 78 extended to the tip 112 of the mandrel 76.

The minimum number of fins 78 located on mandrel 76 is at least two and, in some cases, at least three. In some embodiments, there are at least four fins 78 located on mandrel 76. The plurality of fins 78 on mandrel 76 can be oriented at any angle relative to the adjacent fins to form pathways through which flows the polymer melt. Fins 78 can be equally spaced from one another. Thus, fins 78 can be disposed about 180 degrees or less apart from each other about mandrel 76, about 120 degrees or less apart from each other about mandrel 76, or about 90 degrees or less apart from an adjacent fin about the mandrel.

Figure 7A:
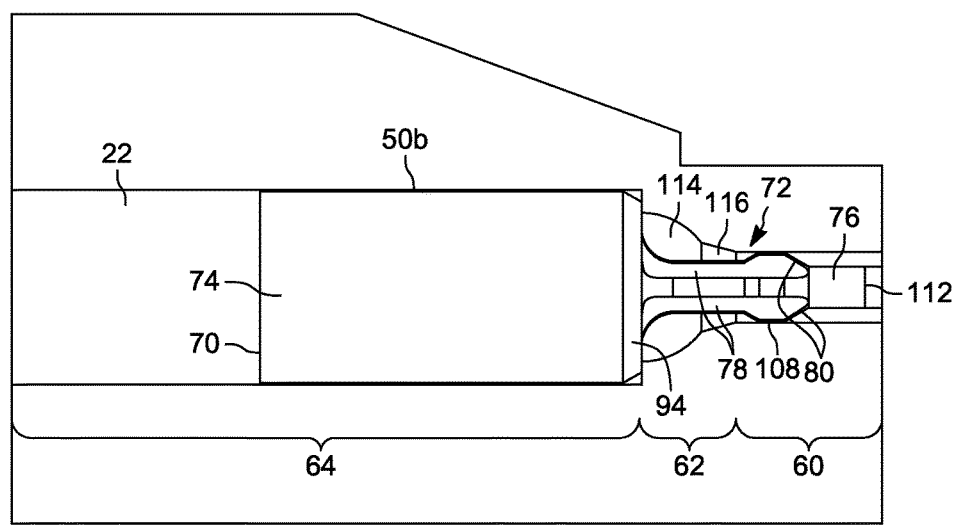
FIG. 7a is a cross-sectional view of the insert of FIG. 6a in the die hole.

Referring now to FIG. 7a, insert 50b is illustrated within die hole 22. The dimensions of insert 50b must be such that they do not exceed the dimensions of die hole 22 at process temperature and must also take into consideration the differential expansion, wherein the metal of insert 50b differs from that of base plate 36 or removable insert 110.

Fins 78 not only form a multiplicity of flow pathways for the process melt, but also further serve to maintain the position of mandrel 76 in die hole 22. Pressure or flow differentials in die hole 22 and/or forces of rotating cutter hub 30 with blade 28 can impart a force onto mandrel 76 that can cause mandrel 76 to move. Fins 78 on mandrel 76 provide additional support and stability for mandrel 76, holding mandrel 76 steady in die hole 22 and preventing mandrel 76 from any undesired movement. Protrusions 108 abut die hole 22, helping to maintain the position of mandrel 76 in die hole 22.

Insert 50b is within die hole 22 such that middle region 104 and forward region 106 of mandrel 76 are significantly contained within die land 60. Also seen therein, die hole taper 62 can comprise two regions, 114 and 116. Region 114 may optionally be curved (shown) or flat (not shown). Similarly, region 116 may optionally be a straight, tapering, diagonal region (shown) or may be flat (not shown). Fins 78 extend through die hole taper 62 and into die land 60, where the protrusions 108 can abut the die land 60 to maintain the position of the mandrel 76.

Once again, the length of die land 60 typically ranges from at least approximately 3.8 millimeters (approximately 0.15 inch) to approximately 31.75 millimeters (approximately 1.25 inches) and is preferably at least approximately 6.4 millimeters (approximately 0.25 inch) to approximately 25 millimeters (approximately 1.00 inch). Mandrel 76 within die land 60 is preferably flush with downstream face of the extrusion die. In an alternative embodiment, the length of mandrel 76 may be less than the length of die land 60. In such an alternative embodiment, the length of mandrel 76 is no more than about 0.50 millimeters (approximately 0.020 inch) to about 5.0 millimeters (approximately 0.20 inch) less than the length of die land 60, thereby making the tip 112 of mandrel 76 very slightly recessed from the downstream face of the extrusion die.

Die land 60 and mandrel 76 can be of similar or different geometry. Die land 60 can be cylindrical or tapered and can be round, oval, rectangular, star-shaped, and the like in geometry. Mandrel 76 may be cylindrical or tapered and can be round, oval, rectangular, star-shaped, and the like in geometry. Forward section 72, via fins 78, may be a pressed fit plug and is preferably press fit into die hole 22.

Figure 7B:
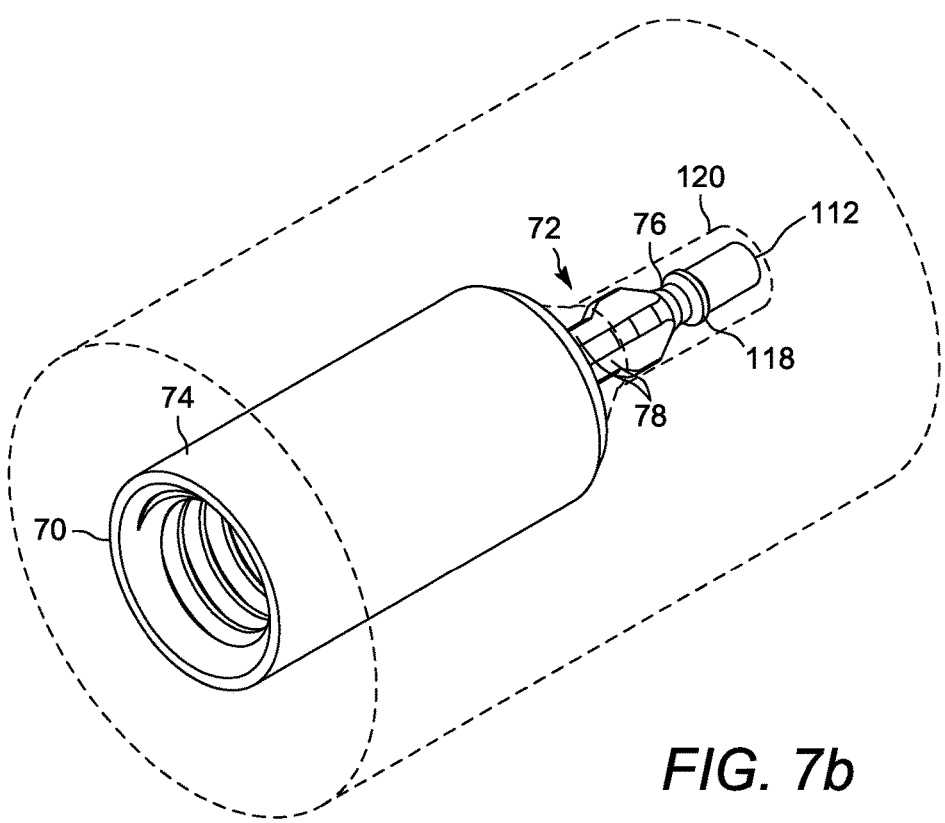
FIG. 7b is an elevated back perspective view of another embodiment of the insert.
Figure 7C:
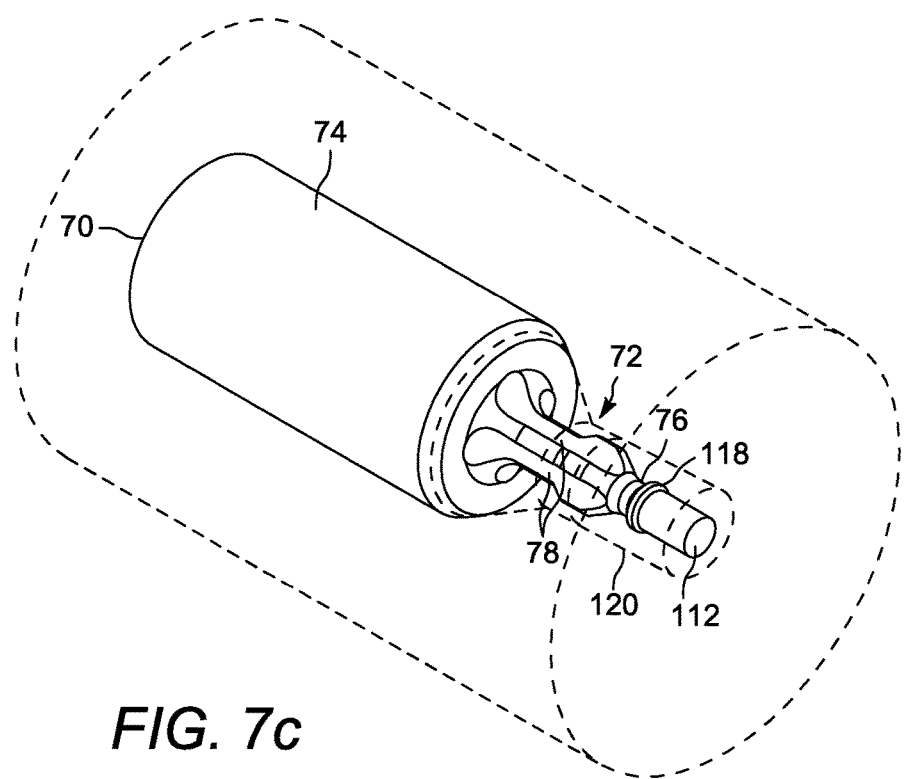
FIG. 7c is a front perspective view of the insert of FIG. 7b.

FIGS. 7b and 7c illustrate the details of another embodiment of insert 50b within die hole 22. FIG. 7b is an elevated back perspective view of the insert, while FIG. 7c is a front perspective view of the insert. As seen therein, mandrel 76 includes protrusion 118. In situations where front wall 88 includes more than one hole 90, protrusion 118 may be used to squeeze the polymer flows that exit holes 90 back together into a single uniform flow. Protrusion 118 works by pressing the melt flow outward between protrusion 118 and the wall 120 of die hole 22 when the melt flow passes over protrusion 118, thereby resulting in a single uniform flow of molten material rather than a plurality of flows.

Insert 50b can be made of any abrasion-resistant material and is preferably metal. The metal can be aluminum, brass, bronze, copper, steel, tool steel, carbon steel, vanadium steel, stainless steel, nickel steel, nickel, and the like without intending to be limited. In some embodiments, the metal may be a good heat conductor including brass, bronze, and copper. Without intending to be bound by any theory, it is believed that the thermally conductive metals maintain uniformity of temperature in the process melt propagating into and through die hole 22. This is effective in minimizing loss of heat and/or variation in temperature as the material flows in the multiplicity of pathways formed by plurality of fins 78. Preferably, the metal selected is greater in strength and abrasion resistance, such as stainless steel, which also has a lower thermal conductivity and is a better heat insulator.

Figure 8A:
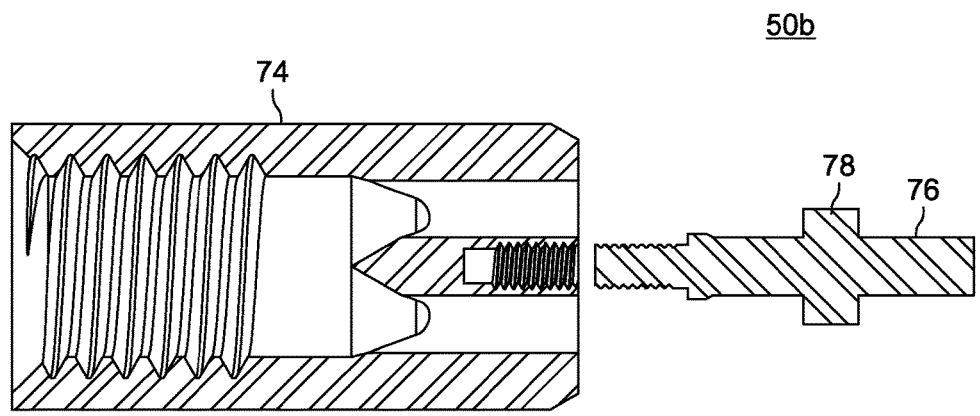
FIGS. 8a and 8b show a side, cross-sectional view of yet another embodiment of the insert.
Figure 8B:
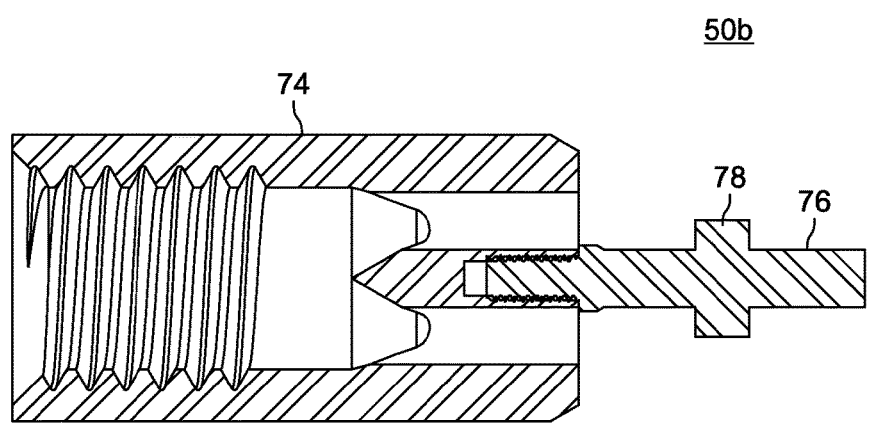
Figure 8C:
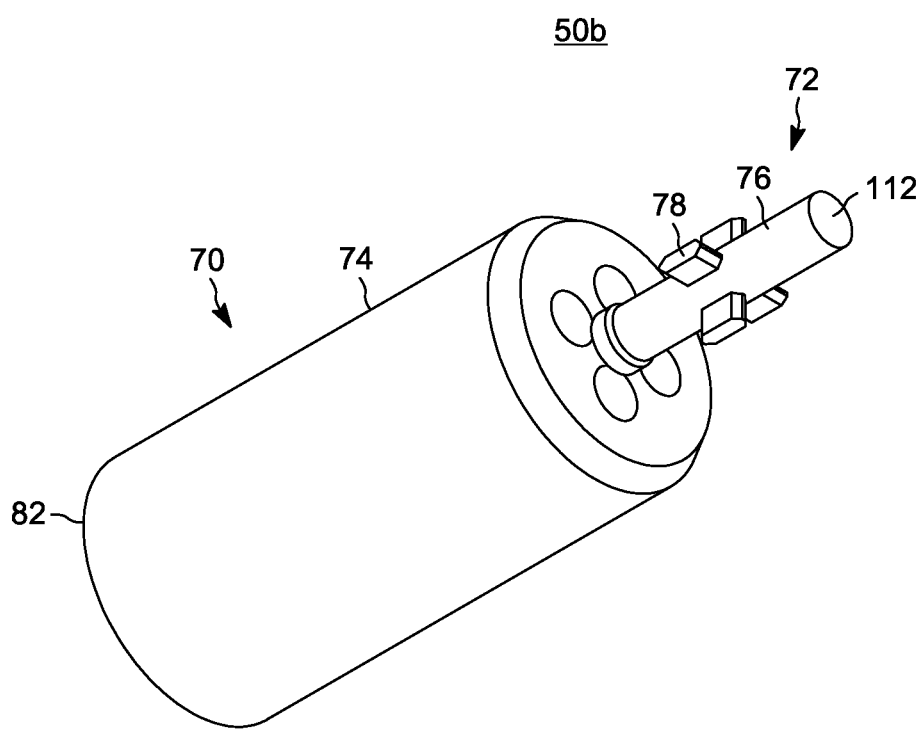
FIG. 8c is a front perspective view of the insert of FIGS. 8a and 8b.

In one embodiment, the insert may be a one-piece assembly comprising the can and the mandrel. In another embodiment, the mandrel may be separate from the can, thereby allowing for a multi-piece assembly. FIGS. 8a-8c show a multi-piece assembly of the insert. Referring first to FIG. 8a, as seen therein, insert 50b comprise can 74 and mandrel 76. In this multi-piece embodiment, mandrel 76 is removable from can 74. Mandrel 76 may be threaded into can 74, as illustrated in FIG. 8b. In the alternative, the mandrel may be attachedly connected to the can in some other manner. FIG. 8c is a front perspective of the multi-piece assembly showing the mandrel 76 attached to can 74.

Figure 9H:
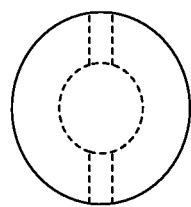
FIGS. 9a-i are illustrations of various pellet geometries in top view, cross-section, and side view, including FIG. 9a that illustrates a top view of a cylindrical pellet through which the hollow completely penetrates.
Figure 9I:
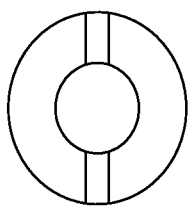
Figure 9F:
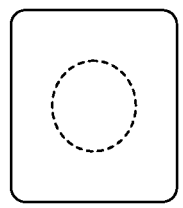
Figure 9G:
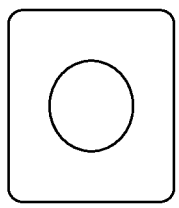
Figure 9D:
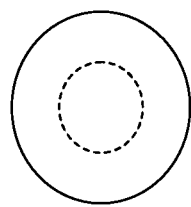
Figure 9E:
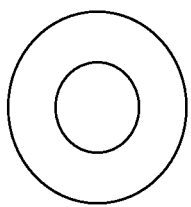
Figure 9A:
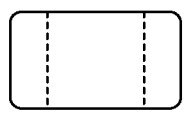
Figure 9B:
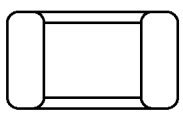
Figure 9C:
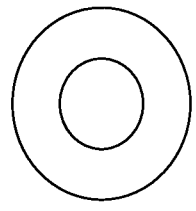

FIGS. 9a-i illustrates the various geometries of the hollow pellets formed in accordance with the present invention. FIG. 9a illustrates a top view of a cylindrical pellet through which the hollow cavity completely penetrates. FIG. 9b illustrates a cross-sectional view of the hollow, cylindrical pellet from FIG. 9a, while FIG. 9c illustrates a side view of the same pellet. FIG. 9d illustrates a top view of an approximately-round pellet with FIG. 9e illustrating the cross-section through that pellet. FIG. 9f illustrates a top view of an approximately-rectangular pellet with FIG. 9g illustrating a cross-sectional view through that pellet, showing a round, hollow cavity within that rectangular pellet. FIG. 9h illustrates a top view of an approximately round pellet with FIG. 9i illustrating a cross-sectional view through that pellet, showing a cavity with perforations into, and through, the pellet wall. It is understood by those skilled in the art that many pellet shapes and cavity shapes can be achieved by methodologies of the present invention without intending to be limited.

Hollow pellet formation is significantly controlled by the melt rheology and, particularly, the melt viscosity. Fractional melt materials typically form torus or donut-shaped pellets as illustrated in FIGS. 9a-c described hereinabove. As the melt viscosity decreases and, therefore, the melt flow index increases, it was found that more closure of the pellet was achievable to form a completely enclosed cavity as illustrated in FIGS. 9d-g. As melt viscosity continues to drop and melt flow index, therefore, increases, less completely enclosed cavities were generated, perforations were introduced, and eventually the cavities were found to collapse or partially collapse leading to irregular cavity geometry.

Additionally, such factors as chemical composition, melting point range, and crystallinity are important, as these affect the fluidity and temperature of the process melt. Crystallization is typically exothermic and adds to the melt process temperature, thereby lowering the viscosity. The narrower the melting point range, the less cooling necessary to significantly increase the solidification and, therefore, the more challenging to form a completely enclosed cavity as compared with a torus or donut-shaped pellet through which the cavity completely penetrates. The polarity, branching, and hydrophobic/hydrophilic interactions of polymers influence the properties in the melt phase as well as the processes leading to solidification. The ability of a material to swell on exiting the die is also an important factor in assessing the closure of the pellet, as well as the necessary difference in diameter of the mandrel and the die land to achieve a pellet of a desired diameter containing a cavity of a particular diameter. As the melt viscosity decreases, the control of these variables decreases and the temperature influences of crystallization, if present, increase.

The moisture uptake was evaluated as a means of elucidating possible entrapment of moisture wherein pelletization was done in the preferred underwater pelletizing. It was anticipated that moisture would be proportionately high wherein entrapment of the transport fluid, preferably water, occurred in the hollow cavities generated. It was surprisingly found that moisture contents were significantly lower than expected after taking into account the difference in mass of a comparable diameter solid pellet to the reduced mass of the hollow pellet and even more surprising that moisture reduction increased as the polarity of the material increased. For example, both polyethylene and polypropylene hollow pellets were found to have comparable moisture content with solid pellets of comparable diameter whereas ethyl vinyl acetate hollow pellets were found to have approximately one-half to two-thirds the moisture of the solid pellet.

Examples of materials for use in making hollow pellets according to the instant invention include, but are not limited to, polymers, copolymers, bio-polymers and bio-plastics, and combinations thereof.

The polymers useful in making the hollow pellets according to the present invention can be polyolefins, cross-linkable polyolefins, polyamides, polyimides, polyesters, polycarbonates, polysulfides, polysulfones, polyurethanes, polyethers, polythioethers, waxes, hot melt adhesives, asphalt, thermoplastic elastomers, rubbers, cellulosics, gum base, vinyl polymers and substituted vinyl polymers including aromatic and aliphatic vinyl polymers, aromatic alkenyl polymers such as polystyrene, and copolymers of the foregoing.

Examples of bio-plastics either as the final hollow pellets or as a component of a formulation with or without any other bio or non-bio polymers or materials include, but are not limited to, polyhydroxyalkanoates, polyglycolides, polylactides, polyethylene glycols, polysaccharides, cellulosics, and starches, polyanhydrides, aliphatic polyesters and polycarbonates, polyorthoesters, polyphosphazenes, polylactones, and polylactams.

The polyolefins useful in the present invention can be ultra-low density polyethylene, linear low density polyethylene, low density polyethylene, medium density polyethylene, high density polyethylene, polybutylene, ionomers, polymethylpentene, polypropylene, ethylene-vinylacetate, alkyl and aryl substituted vinylics, halogenated and polyhalogenated vinylics, polyvinyl esters, polyvinyl alcohol, and copolymers thereof.

One or more additives may be included along with the molten material in making the hollow pellets according to the present invention. The additives can compositionally include, but are not limited to, rheology modifiers, cross-linking facilitating agents, antioxidant agents, ultraviolet stabilizers, thermal stabilizers, dyes, pigments, fillers, fibers, nucleating agents, expanding agents, encapsulated agricultural and pharmaceutical active ingredients, flavors and fragrances, tackifiers, detackifiers, pellet coatings, plasticizers, lubricants, waxes, biomaterial additives (which can include, but are not limited to, cellulosics, starches, and proteinaceous materials), coupling agents, binders, scavengers, synergists, processing aids, and pelletizing aids. The one or more additives can be single-component or multi-component formulations.

The polymers, copolymers, and one or more additives useful in the present invention can be amorphous, crystalline, or combinations thereof. The polymers, copolymers, and one or more additives may contain reactive functionalities, which can be cross-linkable. The reactive functionalities can be modified by chemical reaction, including by expansion.

As was anticipated, back-pressure on the extrusion process increases with the use of the inserts and was found to be alleviated by at least one of increasing the number of holes through the die, increasing the temperature of the process melt, and increasing the temperature of the die. These factors, as is understood by one skilled in the art, are not surprising consequences.

Without wishing to be bound to any theory, hollow pellets made in accordance with the present invention have more surface area to volume ratio and reduce the distance from outside surface to the "core" as compared to normal, solid pellets, thereby providing the hollow pellets with several benefits over solid pellets. For example, use of hollow pellets can increase productivity because the hollow pellets not only melt faster but also dry, crystallize and/or solid state polymerize faster. After formation, some pellets are put in solvents, and the hollow pellets dissolve faster than normal, solid pellets. The hollow pellets also have improved mixing and dispersion properties in pre-compounding blends, thereby allowing for better dry mixing with other materials before being extruded or otherwise used. In some cases, less expensive pellets are needed to accomplish functionalities such as absorbing impact energies or reducing overall weight, and the hollow pellets can provide this. Additionally, expanding agents such as pentane may be included in the molten material, and the resulting pellets can be expanded into shapes such as "foam donuts" and used directly in packaging applications.

The foregoing is considered as illustrative only of the principles of the invention. Because numerous modifications and changes will readily occur to those skilled in the art, it is not desired to limit the invention to the exact embodiments shown and described. Accordingly, all suitable modifications and equivalents may be resorted to, falling within the scope of the invention.

What is claimed is:

1. An extrusion process for producing hollow pellets, the process comprising:
    extruding molten material through an extrusion die comprising a die orifice and an insert disposed in the die orifice, wherein the insert comprises a mandrel and three or more distinct fins extending a length of the insert, the fins maintaining the position of the insert in the die orifice, and wherein at least one of the three or more distinct fins of the insert is tapered;
    cutting the extruded molten material at a die face of the extrusion die using an underwater pelletizer; and
    cooling the cut extruded molten material effective to produce a pellet having a hollow cavity.

2. The process of claim 1, wherein the hollow cavity penetrates a first surface of the pellet and continuously extends through a second surface of the pellet.

3. The process of claim 1, wherein the hollow cavity is completely encapsulated within the pellet.

4. The process of claim 1, wherein the hollow cavity penetrates a first surface of the pellet and extends inwardly to an interior portion of a body of the pellet.

5. The process of claim 1, wherein the extruding comprises pressure extruding.

6. The process of claim 1, wherein the molten material comprises a polyolefin, a cross-linkable polyolefin, vinyl polymer, substituted vinyl polymer, polyester, polyamide, polyether, polythioether, polyurethane, polyimide, polycarbonate, polysulfide, polysulfone, wax, a copolymer thereof, or a formulation comprising at least two of the foregoing.

7. The process of claim 1, wherein the extrusion die is a single-body extrusion die or a removable extrusion die assembly.

8. The process of claim 1, wherein each of the three or more distinct fins is disposed about 180° or less apart from an adjacent fin about the mandrel.

9. The process of claim 1, wherein the three or more distinct fins are at least partially on the mandrel.

10. An extrusion process for producing hollow pellets, the process comprising:
   feeding a molten material into a pelletizer; and
   extruding the molten material through an extrusion die of the pelletizer;
   wherein during extrusion the molten material flows through a hollow can of an insert, flows through at least one hole of the insert, and flows around fins disposed on a mandrel of the insert, said fins extending from an outer surface of the mandrel to engagement with an inner surface of a die orifice in the extrusion die in which the insert is placed.

11. The process of claim 10, wherein after the molten material flows around the fins disposed on the mandrel of the insert the molten material flows around a portion of the insert that does not have fins.

12. The process of claim 10, further comprising cooling the extruded molten material effective to produce a pellet having a hollow cavity, wherein the hollow cavity penetrates a first surface of the pellet and continuously extends through a second surface of the pellet, is completely encapsulated within the pellet, or penetrates the first surface of the pellet and extends inwardly to an interior portion of a body of the pellet.

13. The process of claim 10, wherein the insert comprises a taper between a back edge of the insert and the hollow can, and the molten material flows through the taper.

14. The process of claim 10, wherein the pelletizer is an under fluid pelletizer.

15. A pelletizer for producing hollow pellets, comprising:
   an inlet for receiving a molten material;
   a die hole, downstream of the inlet, for extruding the molten material; and
   an insert disposed in the die hole, the insert comprising a rear section and a forward section, the rear section comprising a hollow can and the forward section comprising a mandrel, the mandrel comprising a plurality of fins, said fins extending from an outer surface of the mandrel to engagement with an inner surface of a die orifice in the extrusion die in which the insert is placed; and the insert further comprising at least one hole configured to enable the molten material to flow from the hollow can to the mandrel,
   wherein the pelletizer is an under fluid pelletizer.

16. The pelletizer of claim 15, the plurality of fins comprising protrusions to maintain the position of the mandrel in the die hole.

17. The pelletizer of claim 15, wherein the mandrel comprises a region furthest from the rear section of the insert, and wherein the region does not comprise fins.

18. The pelletizer of claim 15, wherein the hollow can is threaded.

19. The pelletizer of claim 15, wherein the mandrel is a removable mandrel.

20. The pelletizer of claim 15, wherein the mandrel may be threadedly attached to the can.

* * * * *